(12) United States Patent
Nishihata et al.

(10) Patent No.: US 8,696,138 B2
(45) Date of Patent: *Apr. 15, 2014

(54) FILTER UNIT AND VIDEO PROJECTOR

(75) Inventors: Yosuke Nishihata, Hirakata (JP); Akira Miyanaga, Daito (JP); Yoshiharu Arioka, Osaka (JP); Hideaki Okaniwa, Nagoya (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 62 days.

This patent is subject to a terminal disclaimer.

(21) Appl. No.: 13/153,947

(22) Filed: Jun. 6, 2011

(65) Prior Publication Data

US 2011/0299043 A1 Dec. 8, 2011

(30) Foreign Application Priority Data

Jun. 8, 2010 (JP) ................................. 2010-131293

(51) Int. Cl.
*G03B 21/16* (2006.01)
*B01D 46/28* (2006.01)

(52) U.S. Cl.
USPC ............... 353/57; 353/61; 353/119; 361/678; 361/690

(58) Field of Classification Search
USPC ........................... 353/52, 57, 58, 60, 61, 119; 361/676–678, 679.46, 679.47, 679.48, 361/679.49, 690–698
See application file for complete search history.

(56) References Cited

U.S. PATENT DOCUMENTS

| 6,139,154 | A | 10/2000 | Haba | |
|---|---|---|---|---|
| 8,322,867 | B2* | 12/2012 | Komori | 353/119 |
| 2005/0254021 | A1* | 11/2005 | Lee et al. | 353/119 |
| 2011/0211172 | A1* | 9/2011 | Uozaki et al. | 353/57 |
| 2011/0296803 | A1* | 12/2011 | Nishihata et al. | 55/295 |
| 2011/0298994 | A1* | 12/2011 | Nishihata et al. | 348/744 |
| 2011/0299040 | A1* | 12/2011 | Nishihata et al. | 353/52 |
| 2011/0299041 | A1* | 12/2011 | Nishihata et al. | 353/52 |
| 2011/0299042 | A1* | 12/2011 | Nishihata et al. | 353/52 |
| 2011/0299045 | A1* | 12/2011 | Kotani | 353/57 |
| 2012/0154762 | A1* | 6/2012 | Nishihata et al. | 353/58 |

FOREIGN PATENT DOCUMENTS

| CN | 201141125 Y | 10/2008 |
|---|---|---|
| JP | 2007-156186 A | 6/2007 |
| JP | 2008-065021 A | 3/2008 |
| JP | 2009-082837 A | 4/2009 |
| JP | 2009300075 A | 12/2009 |

OTHER PUBLICATIONS

U.S. Office Action dated May 9, 2013, issued in related U.S. Appl. No. 13/153,870.
U.S. Office Action dated Apr. 25, 2013, issued in related U.S. Appl. No. 13/153,924.

(Continued)

*Primary Examiner* — William C Dowling
(74) *Attorney, Agent, or Firm* — Westerman, Hattori, Daniels & Adrian, LLP

(57) ABSTRACT

A filter unit includes an air filter, which captures dust from intake air, and a cleaning unit, which automatically cleans the air filter. The cleaning unit includes a rotation brush, which removes dust from the air filter, and a dust box, which extends parallel to the rotation brush. The dust box includes a dust inlet that opens toward the rotation brush and receives dust from the rotation brush. The dust box is removable from the filter unit.

12 Claims, 17 Drawing Sheets

(56) References Cited

OTHER PUBLICATIONS

Chinese Office Action dated May 21, 2013, issued in corresponding Chinese Patent Application No. 201110147885.4.

U.S. Office Action dated Jul. 19, 2013, issued in related U.S. Appl. No. 13/153,719 (13 pages).

Office Action dated Dec. 2, 2013, issued in corresponding Chinese application No. 201110147885.4, w/ partial English translation.

* cited by examiner

FILTER UNIT AND VIDEO PROJECTOR

CROSS-REFERENCE TO RELATED APPLICATIONS

This application is based upon and claims the benefit of priority from prior Japanese Patent Application No. 2010-131293, filed on Jun. 8, 2010, the entire contents of which are incorporated herein by reference.

BACKGROUND OF THE INVENTION

The present invention relates to a filter unit and a video projector including the filter unit.

A video projector uses air current to cool optical system elements such as a light source lamp or a light valve. Such a video projector includes an air filter device that automatically cleans an air filter though which the air current flows. The video projector may be arranged facing any of various directions depending on where it is set. This may hinder maintenance of the air filter. Accordingly, an air filter device that is removable from a video projector and an air filter device that automatically cleans the air filter have been proposed.

Japanese Laid-Open Patent Publication No. 2008-65021 describes an air filter device including a pre-filter, a second filter, a third filter, and an elongated brush, which removes dust from the pre-filter. The elongated brush extends across a filtering surface of the pre-filter while holding opposite sides of the filtering surface. The pre-filter moves back and forth in a direction perpendicular to the longitudinal direction of the brush. As a result, the elongated brush removes dust from the pre-filter. The dust removed from the pre-filter is collected in a filter unit. The dust collected in the filter unit is disposed of by removing the filter unit from the air filter device.

SUMMARY OF THE INVENTION

In the air filter device of the above publication, the dust removed from the pre-filter by the elongated brush is collected in the filter unit. However, the elongated brush is also arranged in the filter unit. This makes it difficult to keep the dust in the filter unit. Thus, the dust collected in the filter unit may be scattered again as the filter unit moves. Further, for the disposal of dust from the filter unit, the elongated brush must be removed from the filter unit, which may be a difficult task.

One aspect of the present invention is a filter unit including an air filter that captures dust from intake air and a cleaning unit that automatically cleans the air filter. The cleaning unit includes a rotation brush that removes dust from the air filter and includes a rotation axis and a dust box, a longitudinal direction of which is parallel to the rotation axis of the rotation brush. The dust box includes a dust inlet that extends in the longitudinal direction and opens toward the rotation brush to receive dust from the rotation brush. The dust box is removable from the filter unit.

Another aspect of the present invention is a filter unit including a base including an opening through which air is drawn, a flat air filter coupled to the base to capture dust from the air passing through the opening, and a self-propelled cleaning unit arranged at an upstream side of the air filter to clean the air filter. The cleaning unit includes a housing movably coupled to the base, a rotation brush coupled to the housing facing toward the upstream side of the air filter and including a rotation axis, and a dust box pivotally supported by the housing and removable from the housing. The dust box includes a dust inlet that extends in the rotation axis of the rotation brush and opens toward the rotation brush to receive dust from the rotation brush.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
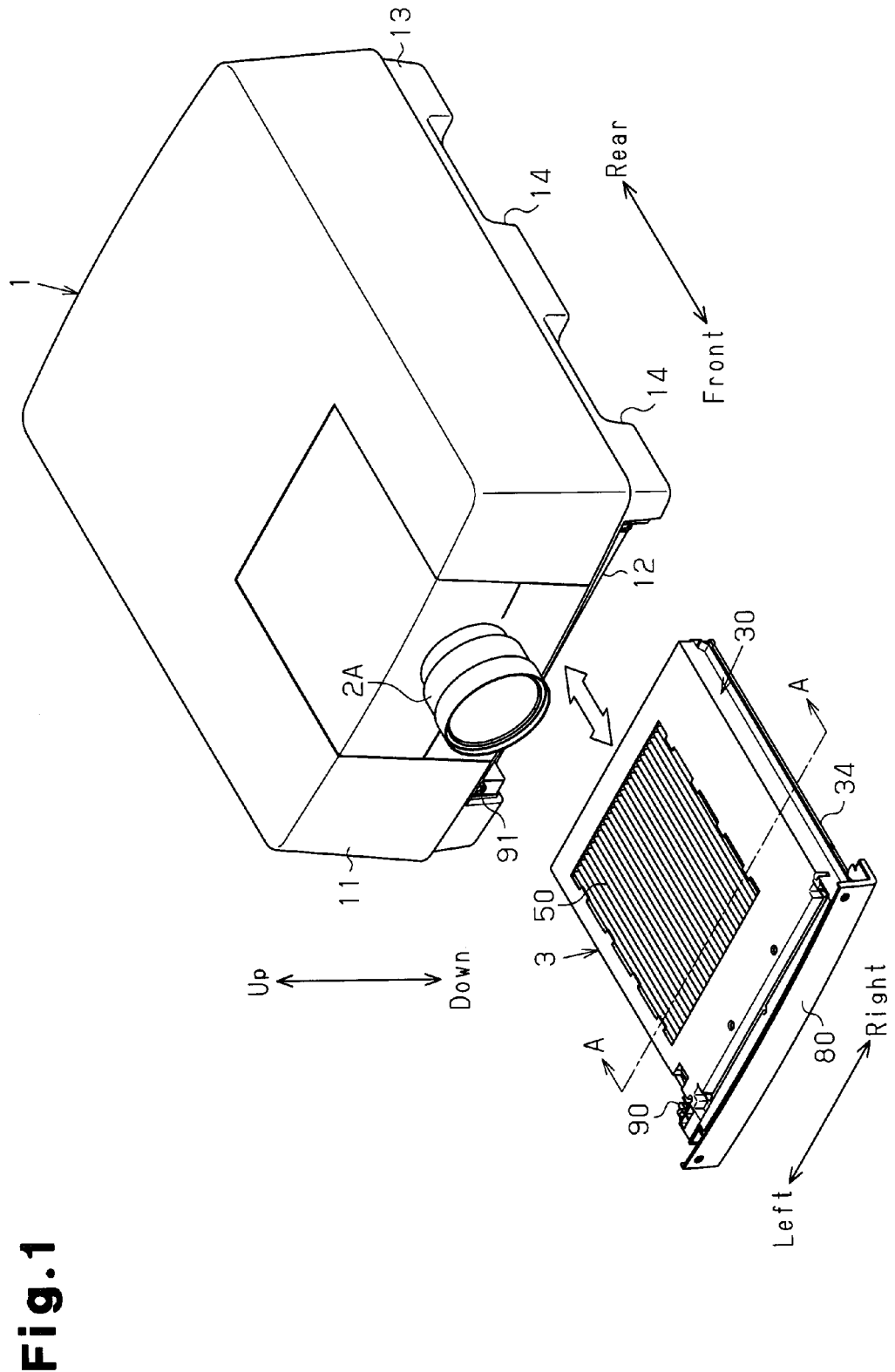
FIG. 1 is a perspective view of a video projector and a filter unit according to one embodiment of the present invention.

A video projector according to one embodiment of the present invention will now be discussed with reference to the drawings. FIG. 1 shows a state in which the video projector is set upright. In the description hereafter, unless otherwise indicated, the upper, lower, left, right, front, and rear directions are as indicated by the arrows shown in FIG. 1.

The video projector is, for example, a three-LCD type video projector. The projector includes an outer case 1. The outer case 1 accommodates an optical system 2 such as that shown in FIG. 2. A projection lens 2A extends from a front wall 11 of the outer case 1. A filter unit 3 is arranged in an air inlet 12 of the outer case 1. The filter unit 3 can be slid out from the front wall 11 of the outer case 1. The filter unit 3 includes an upstream side that is in communication with the exterior of the projector through a plurality of slits 14, which are arranged in a side wall 13 of the outer case 1. Cooling air such as ambient air flows into the outer case 1 through the slits 14 and the upstream side of the filter unit 3.

Figure 2:
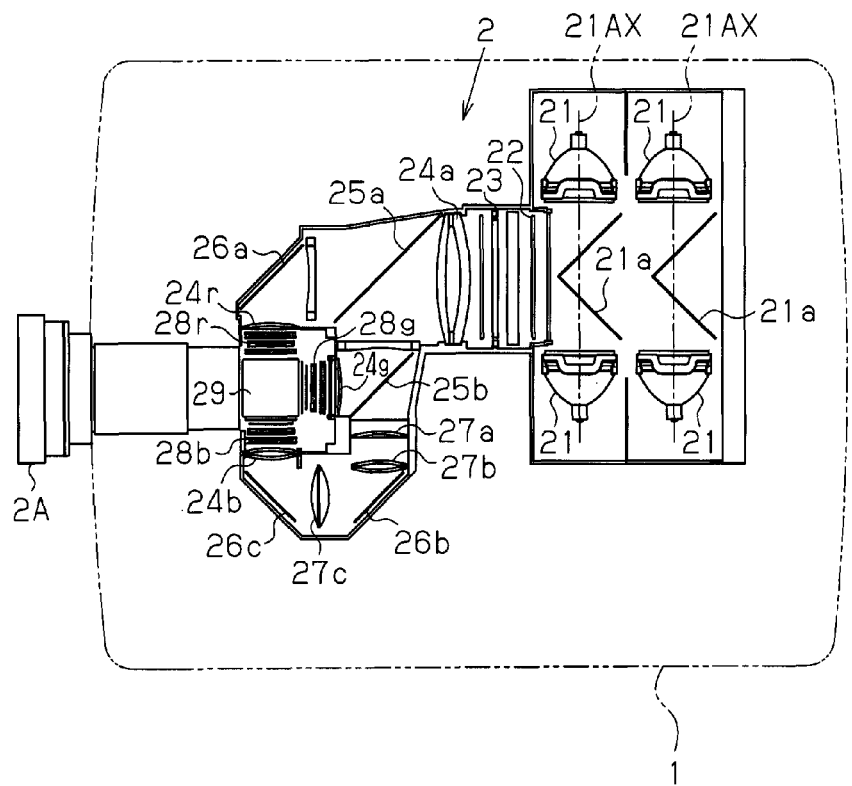
FIG. 2 is a schematic plan view showing an optical system in the video projector of FIG. 1.

Referring to FIG. 2, the optical system 2 includes four light source lamps 21, which serve as a light source and are each formed by a discharge lamp. Each lamp 21 has an optical axis 21AX, which is substantially parallel to the front wall 11 of the outer case 1. The illumination light generated by the four light source lamps 21 are combined by optical path changing members 21a and emitted in a predetermined direction (e.g., frontward direction).

An integrator lens 22, polarizing beam splitter 23, and condenser lens 24a guide the illumination light to a color separation optical system, which separates the illumination light into three colors of light, namely, red light, green light, and blue light. The color separation optical system includes, for example, two dichroic mirrors 25a and 25b, three total reflection mirrors 26a, 26b, and 26c, three relay lenses 27a, 27b, and 27c, and three condenser lenses 24r, 24g, and 24b. Red, green, and blue liquid crystal light valves 28r, 28g, and 28b respectively perform optical modulation on the red light, green light, and blue light. A cross-dichroic prism 29 combines the modulated light into image light, which is emitted from the projection lens 2A. Some of the elements in the optical system 2 require to be cooled by the cooling air. The elements that are to be cooled are, for example, the lamps 21, the liquid crystal panels and polarization plates of the liquid crystal light valves 28r, 28g, and 28b, and the polarizing beam splitter 23. Of these, the lamps 21 become the hottest.

Figure 3:
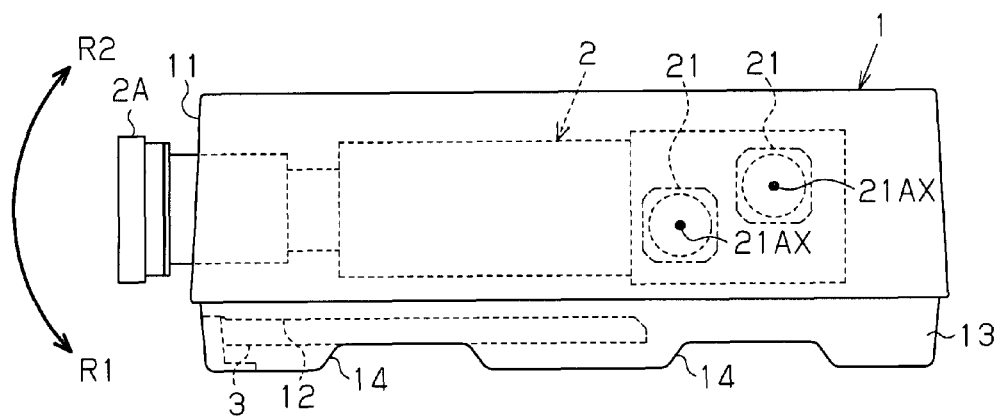
FIG. 3 is a side view showing the video projector of FIG. 1.
Figure 4A:
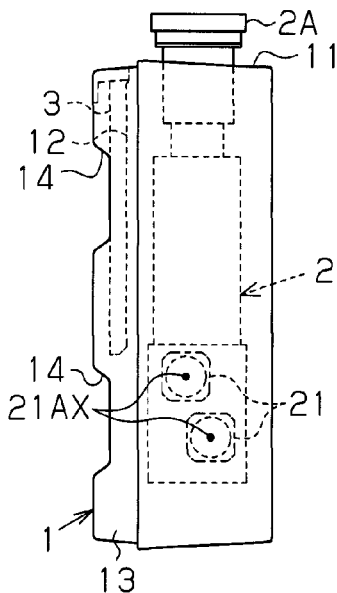
FIG. 4(a) is a side view showing the video projector oriented in an upward projection state.
Figure 4B:
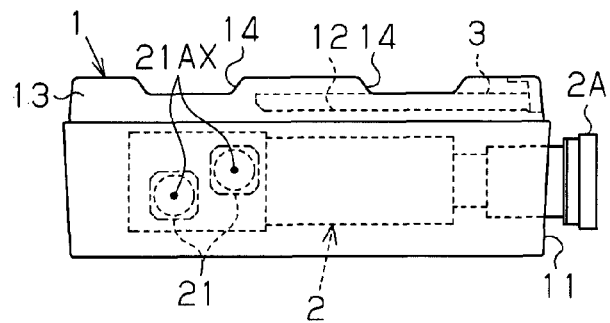
FIG. 4(b) is a side view showing the video projector in a ceiling-suspended projection state.
Figure 4C:
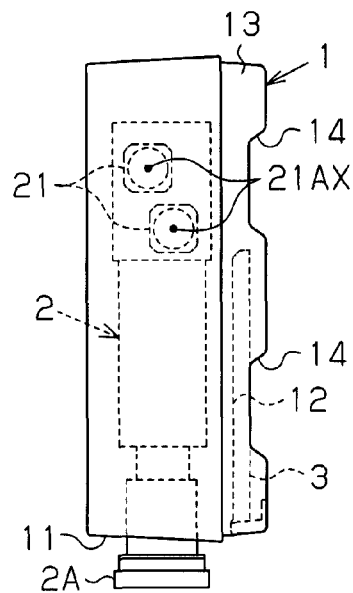
FIG. 4(c) is a side view showing the video projector in a downward projection state.

The video projector may be set in an upright projection state as shown in FIG. 3. The video projector may also be set in a state rotated from the state of FIG. 3 in the directions of arrows R1 and R2 so that the optical axis 21AX of each lamp 21 is always horizontal. For example, the video projection may be set in an upward projection state shown in FIG. 4(a), a suspended projection state shown in FIG. 4(b), or a downward projection state shown in FIG. 4(c). In this manner, the use of the video projector in a state in which the optical axis 21AX of each lamp 21 is always horizontal prevents excessive heating of the lamp 21.

Figure 5:
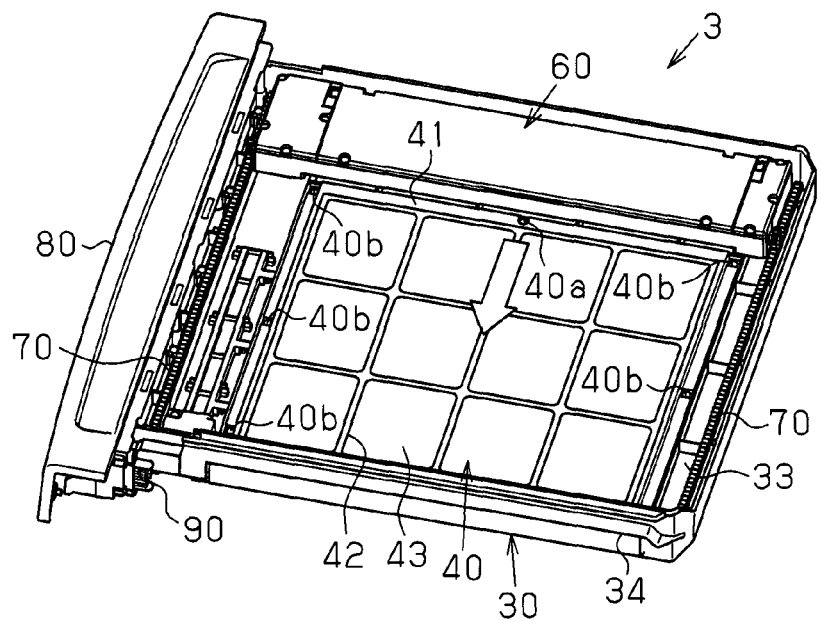
FIG. 5 is a perspective view showing the filter unit and a self-propelled cleaning unit located at a standby position.
Figure 6:
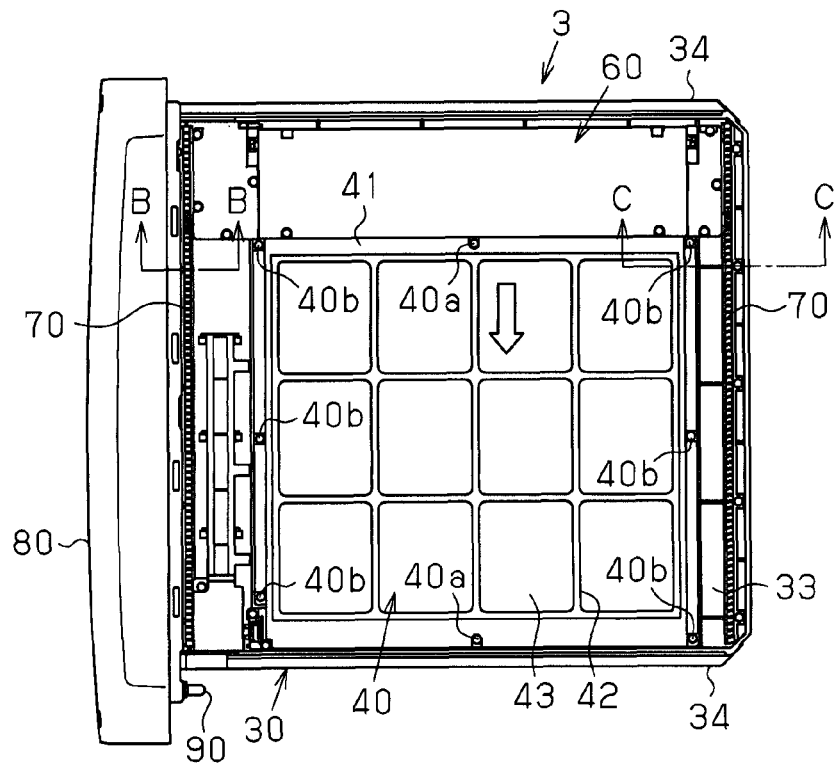
FIG. 6 is a plan view showing the filter unit of FIG. 5.
Figure 7:
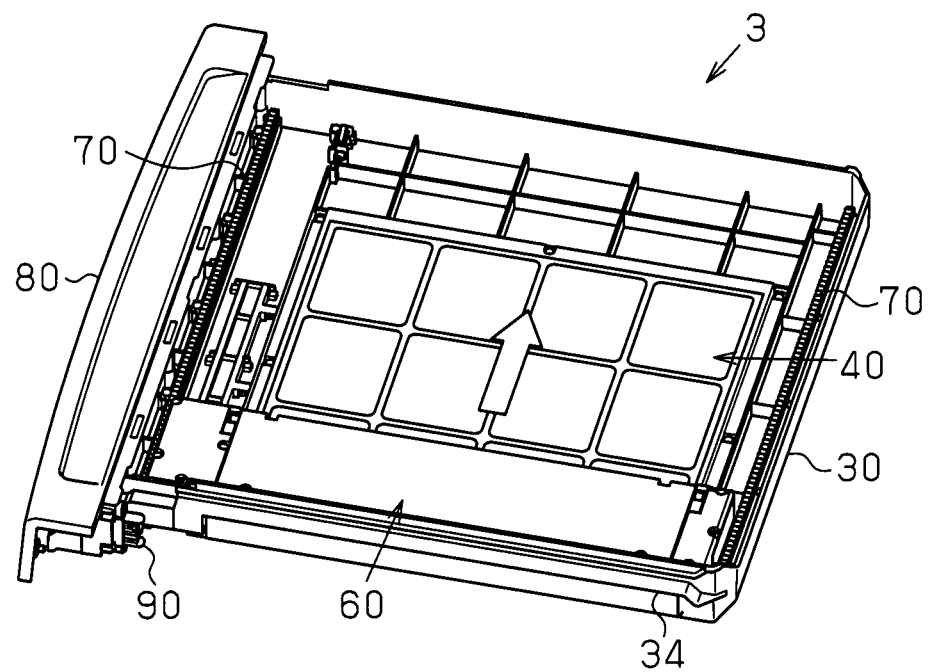
FIG. 7 is a perspective view showing the filter unit in a state in which a self-propelled cleaning unit is located at a return position.

FIG. 1 shows the video projector in a state in which the filter unit 3 is drawn out from the front wall 11. FIGS. 5 and 6 show the bottom surface of the filter unit 3. Referring to FIG. 7, the filter unit 3 includes a base 30, a first air filter 40, a second air filter 50, a self-propelled cleaning unit (automatic cleaner) 60, two racks 70, and a handle 80. The first air filter 40, cleaning unit 60, and racks 70 are arranged at an upstream side of the base 30. The second air filter 50 is arranged at the downstream side of the base 30. The handle 80 is arranged at the front of the base 30.

Figure 8:
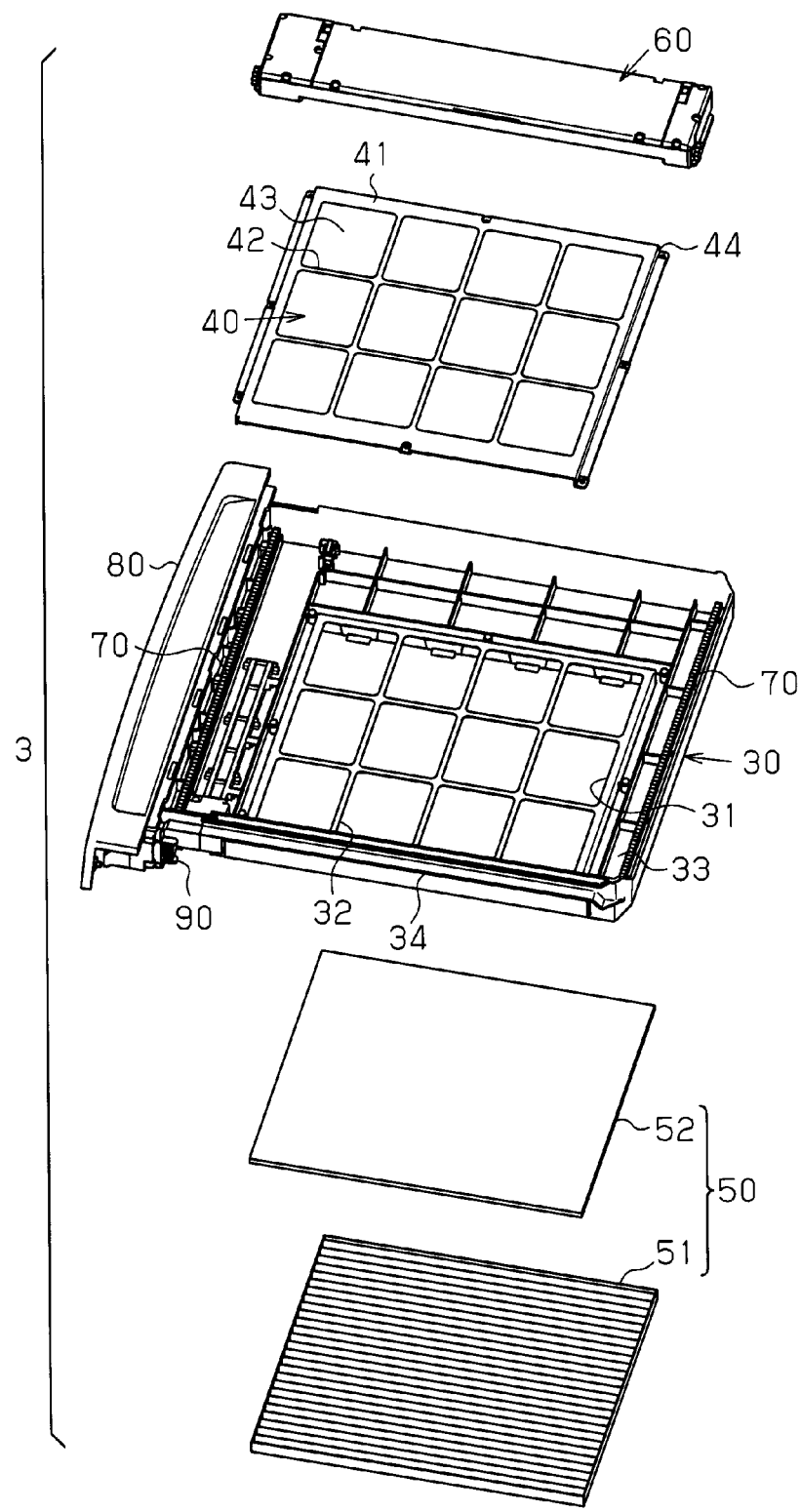
FIG. 8 is an exploded perspective view showing the filter unit of FIG. 5.

Referring to FIG. 8, the base 30 includes a frame 33 and a grid 32. The frame 33 includes an opening 31, which serves as a cooling air intake port. The grid 32 is coupled to the frame 33. The frame 33 and grid 32 may be formed integrally with each other. The base 30 may be a molded resin product.

The handle 80 is coupled to the frame 33 of the base 30. The cleaning unit 60 is coupled to the base 30 in a movable manner. FIGS. 5 and 6 shown the cleaning unit 60 arranged at an initial position, or standby position. The cleaning unit 60 moves back and forth between the standby position and a return position, or remote position, which is shown in FIG. 7. In the illustrated example, the standby position and the return position of the cleaning unit 60 are respectively located at the right and left ends of the base 30. The base 30 includes left and right walls each forming a rail 34. The filter unit 3 slides along the rails 34 in the outer case 1. The two racks 70 are coupled to the upstream side of the base 30. The racks 70 are located at opposite sides of the opening 31 near the front and rear ends of the base 30. The cleaning unit 60 moves in engagement with the two racks 70.

The first air filter 40 is coupled to the upstream side of the base 30 at a position corresponding to the opening 31. As shown in FIG. 8, the first air filter 40 includes a rim 41, a grid 42, and a porous filtering portion 43, which are formed integrally with one another. The rim 41 may include a bent portion 44 to increase rigidity and strength. Fasteners fasten the rim 41 of the first air filter 40 to the frame 33 of the base 30. The fasteners may be screws 40a and 40b, which extend perpendicular to the filtering surface of the first air filter 40.

Figure 9:
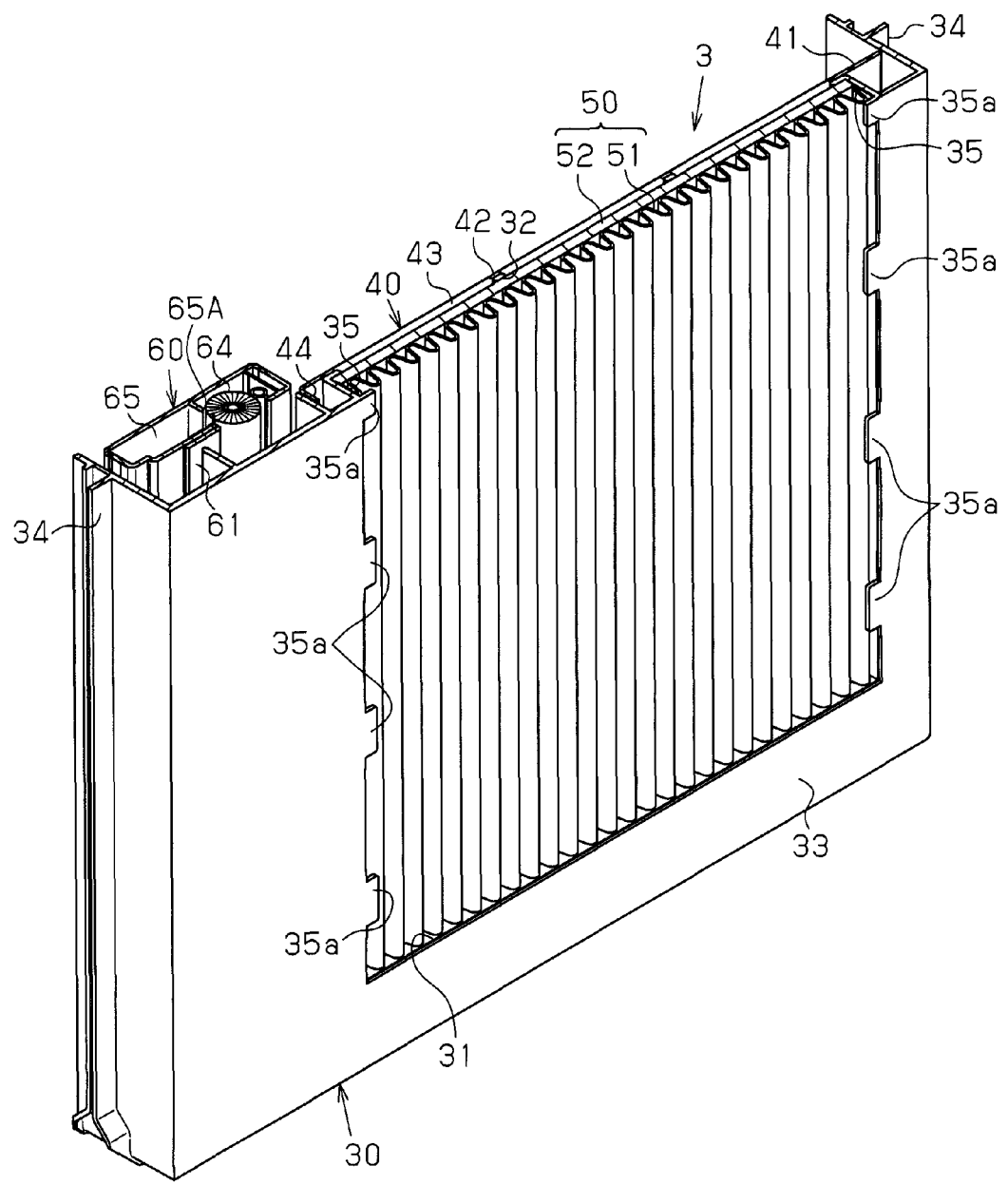
FIG. 9 is a perspective view showing the filter unit in cross-section along line A-A in FIG. 1.

The second air filter 50 is coupled to the downstream side of the base 30 in correspondence with the opening 31 of the base 30. As shown in FIG. 8, the second air filter 50 has a laminated structure including an electrostatic filtering member 51, which includes polymer fibers charged with static electricity, and a urethane sheet 52, which is flat and functions as a cushion. The urethane sheet 52 is located at the downstream side of the frame 33 of the base 30 and the upstream side of the electrostatic filtering member 51. As shown in FIG. 9, the frame 33 of the base 30 includes U-shaped grooves, or U-shaped retainers 35, which hold edges of the second air filter 50. The U-shaped retainers 35 include a plurality of holding portions, or tabs 35a, which extend inward from the frame 33 into the opening 31. The tabs 35a cooperate with opposing upstream holding portions to hold the edges of the second air filter 50. Accordingly, the upstream side of the urethane sheet 52, which is the upstream one of the two members forming the second air filter 50, is supported in a state abut against the frame 33 of the base 30, and the edges of the urethane sheet 52 are forced into the U-shaped retainers 35. In this manner, the second air filter 50 is coupled to the base 30. The second air filter 50 may be coupled to and removed from the frame 33 of the base 30 in a direction generally perpendicular to the filtering surface of the second air filter 50.

The electrostatic filtering member 51 of the second air filter 50 includes a filtering sheet, which has a plurality of pleats. The electrostatic filtering member 51 captures particles of dust that are finer than the particles of dust captured by the first air filter 40. The urethane sheet 52, which functions as a cushion, facilitates the coupling of the edges of the second air filter 50 to the U-shaped retainers 35.

Figure 10:
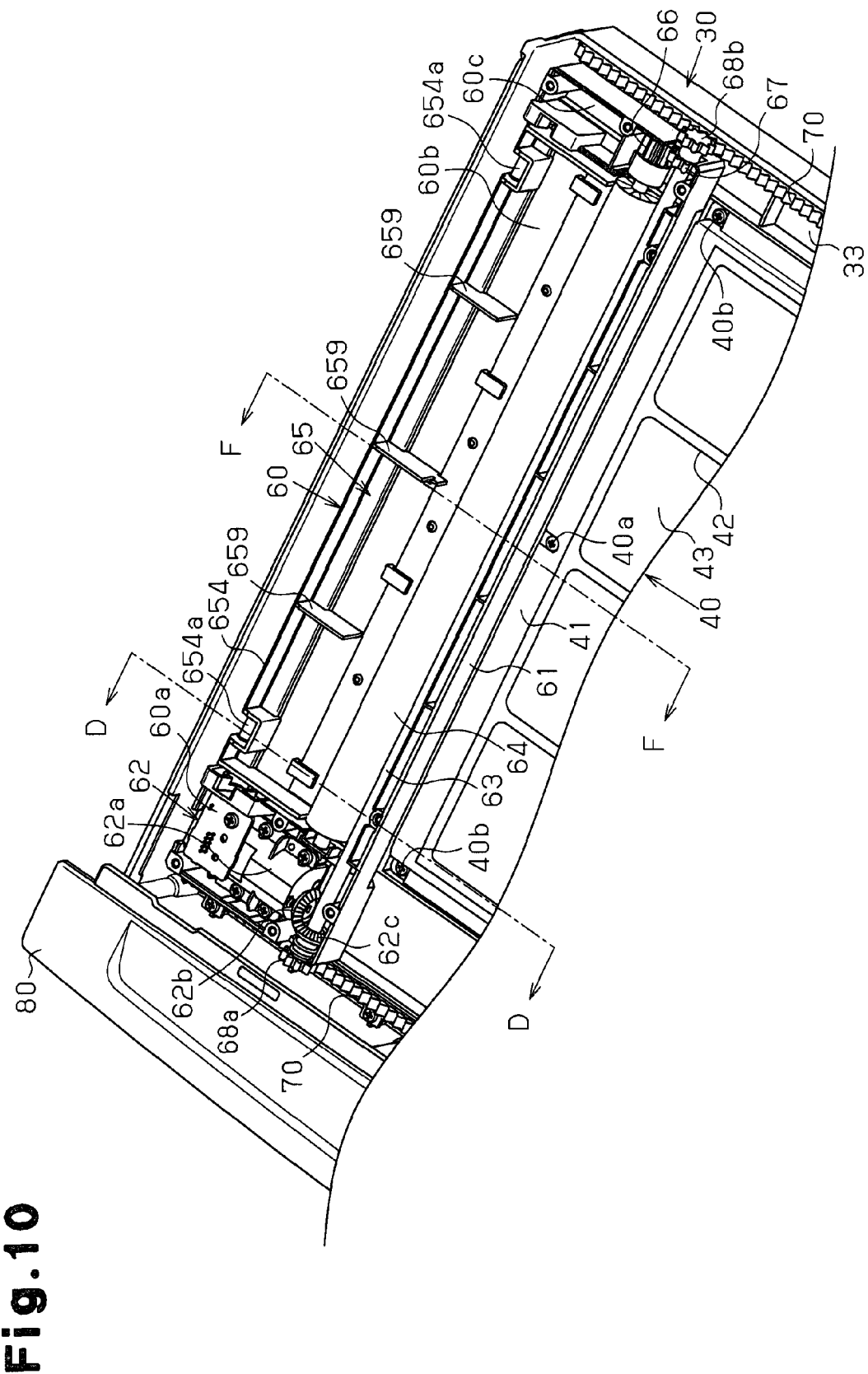
FIG. 10 is an enlarged perspective view of the filter unit showing the interior of the self-propelled cleaning unit.

The cleaning unit 60 automatically cleans the first air filter 40. As shown in FIGS. 9 and 10, the cleaning unit 60 is arranged at the upstream side of the filter unit 3. The cleaning unit 60 may be elongated and level. The longitudinal direction of the cleaning unit 60 is generally parallel to the left and right sides of the first air filter 40. The cleaning unit 60 includes a housing 61 and a drive unit 62, which is arranged in the housing 61. As shown in FIG. 10, the cleaning unit 60 includes a drive compartment 60a, which accommodates the drive unit 62, a dust removal compartment 60b, which accommodates a transmission shaft 63, a rotation brush 64, and a dust box 65, and a clutch compartment 60c, which accommodates a one-way clutch 66 and a spur gear 67.

The drive unit 62 includes a motor 62a and bevel gears 62b and 62c. The motor 62a includes an output shaft, which extends perpendicular to the longitudinal direction of the housing 61. The bevel gear 62b is arranged on the output shaft of the motor 62a. The bevel gear 62c is arranged on a basal end of the transmission shaft 63 to engage the bevel gear 62b. Torque is transmitted from the motor 62a to the transmission shaft 63.

Figure 11:
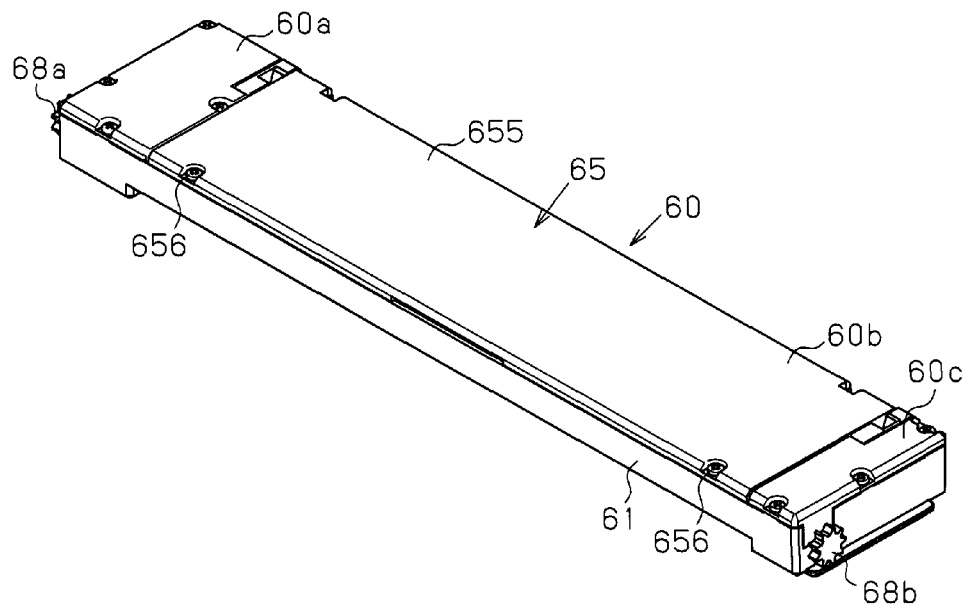
FIGS. 11(a) and 11(b) are perspective views of the self-propelled cleaning unit.
Figure 11:
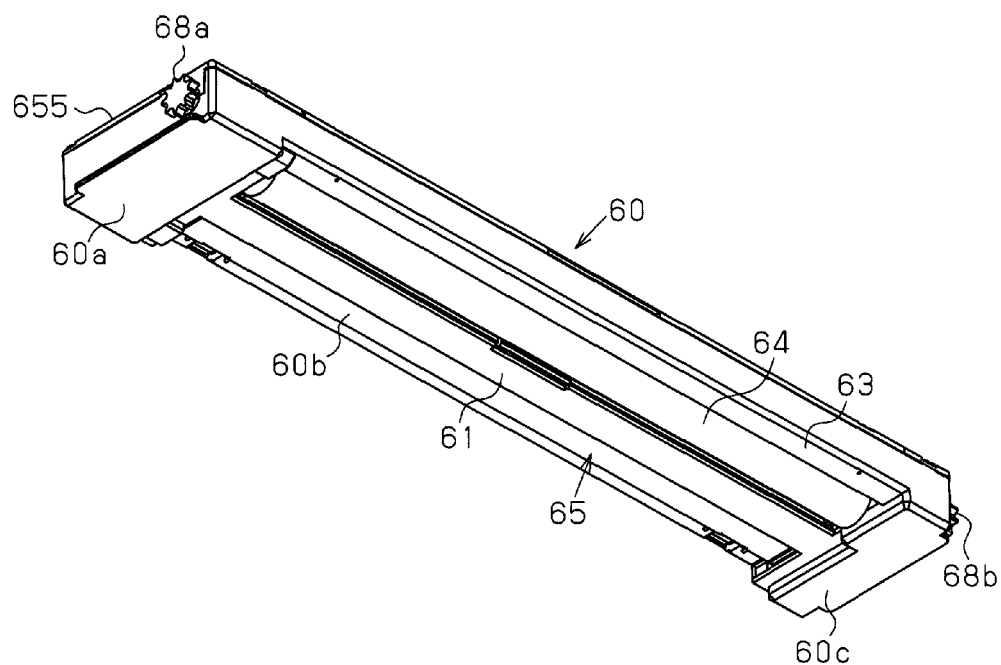

The clutch compartment 60c accommodates a spur gear 67 and the one-way clutch 66. The spur gear 67 is arranged on a distal end of the transmission shaft 63. The one-way clutch 66 is arranged on a shaft 64a of the rotation brush 64. As shown in FIGS. 11(a) and 11(b), the transmission shaft 63 has two ends projecting outward from the housing 61. Pinions 68a and 68b are respectively arranged on front and rear ends of the transmission shaft 63. The pinions 68a and 68b are engaged with the corresponding rack 70, which extends parallel to the optical axis 21AX of each lamp 21.

The dust removal compartment 60b occupies most of the housing 61 leaving space for only the drive compartment 60a and the clutch compartment 60c. The length of the dust removal compartment 60b is about the same as that of the left and right sides of the first air filter 40. The transmission shaft 63, rotation brush 64, and dust box 65 are arranged in the dust removal compartment 60b in this order from the side closer to the first air filter 40. The lengths of the transmission shaft 63, rotation brush 64, and dust box 65 are about the same as the left and right sides of the first air filter 40.

As shown in FIG. 10, the motor 62a rotates the transmission shaft 63 through the bevel gears 62b and 62c. The pinions 68a and 68b at the front and rear ends of the transmission shaft 63 are engaged with the corresponding racks 70. The gear mechanism of the pinions 68a and 68b and the racks 70 convert rotation of the transmission shaft 63 to linear motion of the cleaning unit 60. Accordingly, the cleaning unit 60 moves parallel to the optical axis AX of each lamp 21. As long as the video projector is set so that the optical axis 21AX of each lamp 21 is horizontal as shown in FIGS. 3 and 4, the direction in which the cleaning unit 60 moves, that is, the direction in which the rotation brush 64 moves, is always horizontal.

Figure 12:
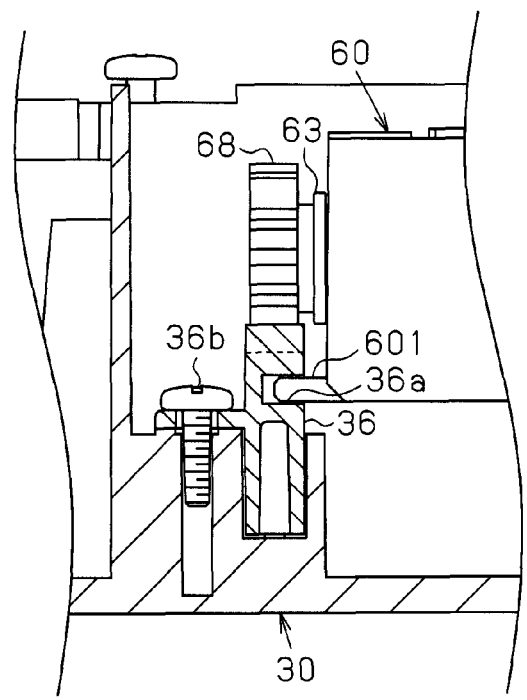
FIG. 12 is partial cross-sectional view of the filter unit taken along line B-B in FIG. 6.
Figure 13:
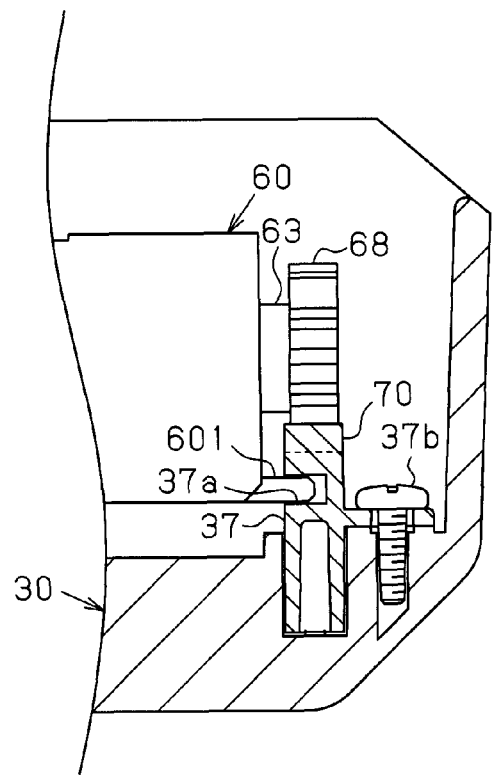
FIG. 13 is partial cross-sectional view of the filter unit taken along line C-C in FIG. 6.

The motor 62a drives the cleaning unit 60 from the standby position shown in FIG. 5 to the return position shown in FIG. 12. A position sensor (not shown) detects the cleaning unit 60 when moved to the return position. In response to such detection, the motor 62a produces reverse rotation and returns the cleaning unit 60 to the standby position. In one example, the pinions 68a and 68b are rotated in the counterclockwise direction as viewed from the front wall 11 when the cleaning unit 60 moves from the standby position of FIG. 5 to the return position of FIG. 7. The pinions 68a and 68b are rotated in the clockwise direction as viewed from the front wall 11 when the cleaning unit 60 moves from the return position of FIG. 7 to the standby position of FIG. 5. As shown in FIGS. 12 and 13, planar projections 601 project from front and rear walls of the housing 61. Seats 36 and 37 respectively support the two racks 70 of the base 30. Grooves 36a and 37a are respectively formed in side walls of the seats 36 and 37 to receive the corresponding projections 601 in a movable manner. The projections 601 and the grooves 36a and 37a smoothes the movement of the cleaning unit 60 and reduces the vibrations of the cleaning unit 60. Screws 36b and 37b shown in FIGS. 13 and 14 respectively fix the seats 36 and 37 to the base 30.

Figure 14:
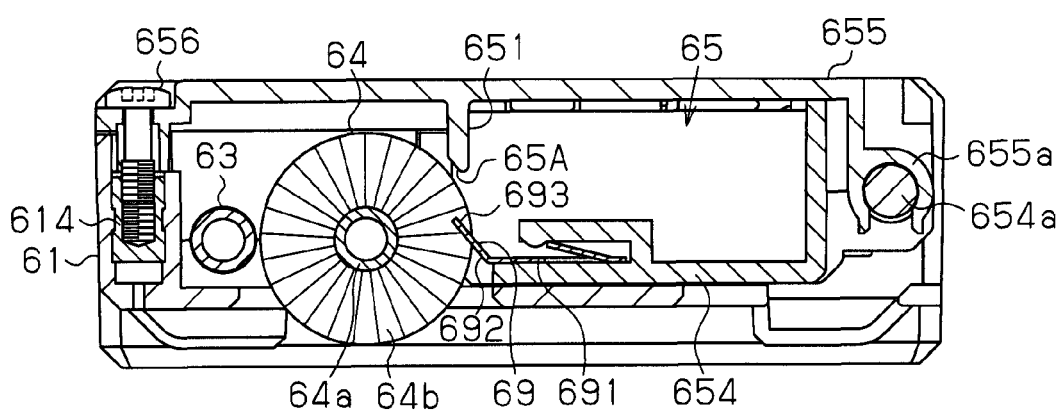
FIG. 14 is a cross-sectional view showing the self-propelled cleaning unit in a closed state at a position corresponding to line D-D in FIG. 10.

The cross-sectional diagram of FIG. 14 shows the cleaning unit 60 taken along line D-D in FIG. 10. As shown in FIG. 14, the rotation brush 64 includes a shaft 64a, which is formed from metal or resin, and a brushing member 64b, which is wound around the shaft 64a. The brushing member 64b includes bristles or fins extending outward in the radial direction from the shaft 64a. As shown in FIG. 10, the one-way clutch 66 is arranged on a distal end of the shaft 64a.

As shown in FIG. 14, distal ends of the bristles or fins of the rotation brush 64 extend from the dust removal compartment 60b toward the upstream surface of the first air filter 40 to remove dust from the first air filter 40. The dust box 65 is formed at the rear of the rotation brush 64 with respect to the direction in which the cleaning unit 60 moves from the standby position to the return position.

The dust box 65 is an elongated container extending parallel to the longitudinal axis, or the rotation axis, of the rotation brush 64. The dust box 65 may be a resin molded product. A dust inlet 65A is formed in a side wall of the dust box 65 to receive dust from the rotation brush 64. The dust inlet 65A opens toward the rotation brush 64. The distal ends of the bristles or fins of the rotation brush 64 enter the dust box 65 through the dust inlet 65A.

A dust remover 69 is arranged in the dust inlet 65A of the dust box 65. The dust remover 69 removes dust from the rotation brush 64. In the illustrated example, the dust remover 69 extends diagonally from an inner surface of the dust box 65. A partition wall 651 extends toward the dust remover 69 at the dust inlet 65A of the dust box 65. The partition wall 651 is arranged between the dust box 65 and the rotation brush 64. Further, the partition wall 651 prevents dust, which is removed from the rotation brush 64 by the dust remover 69 and collected in the dust box 65, from being scattered out of the dust box 65.

Figure 15:
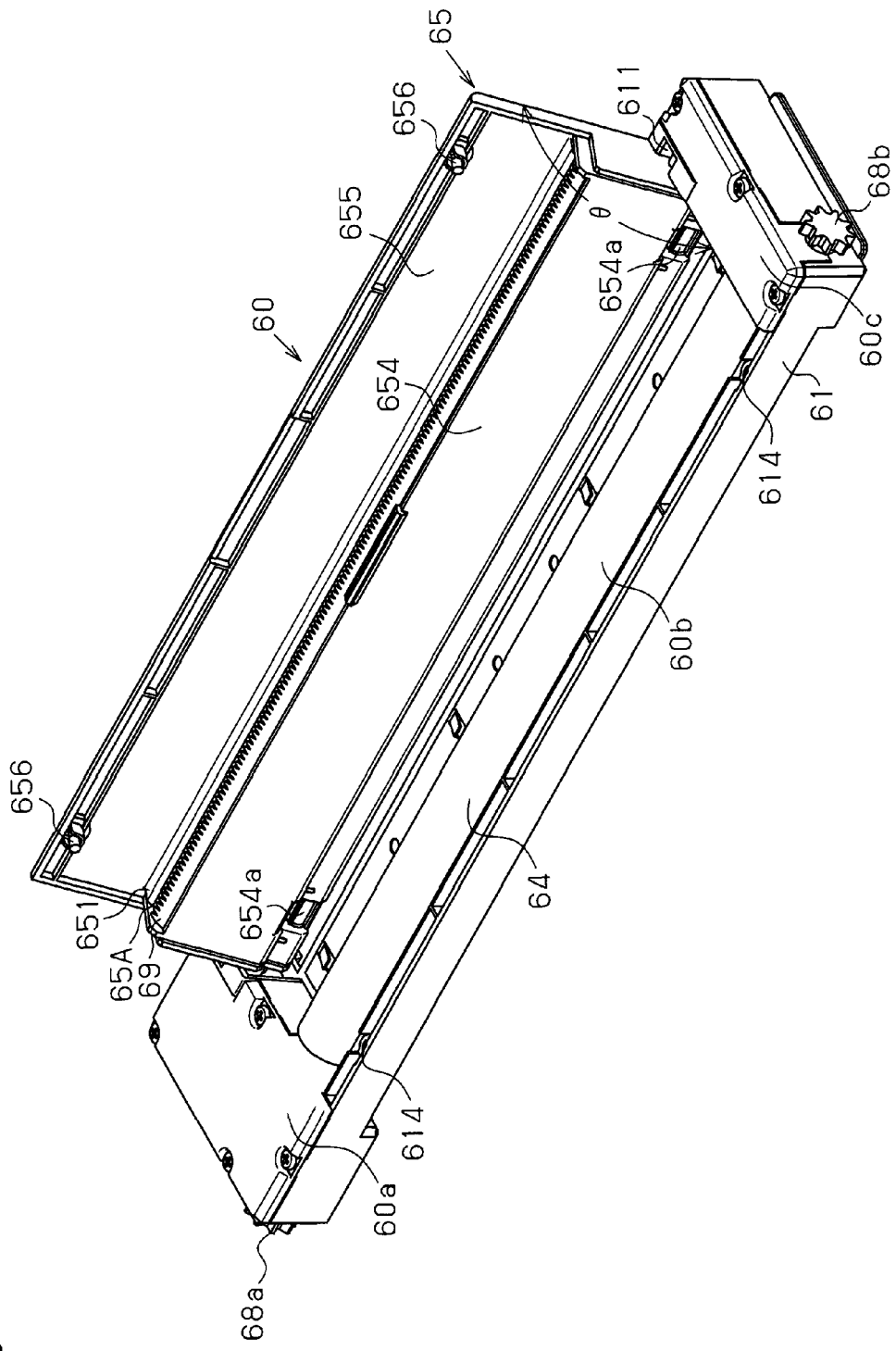
FIG. 15 is a perspective view showing the self-propelled cleaning unit in a state in which a dust box is pivoted to a removable position.
Figure 16A:
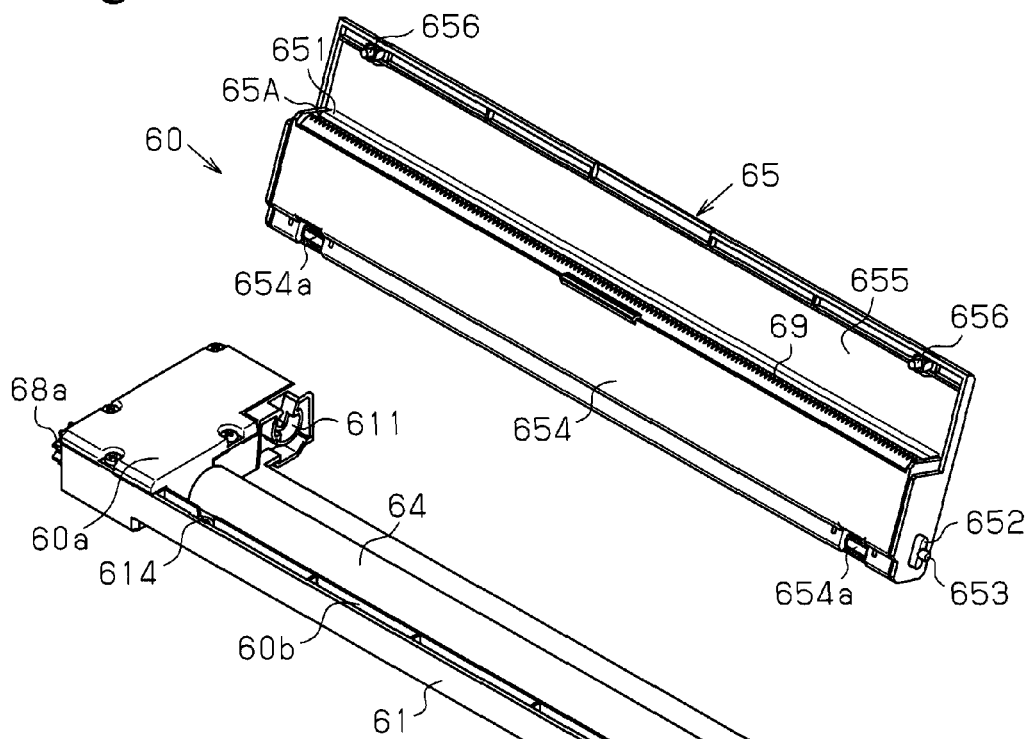
FIG. 16(a) is an exploded perspective view of the self-propelled cleaning unit in a state in which the dust box is removed.
Figure 16B:
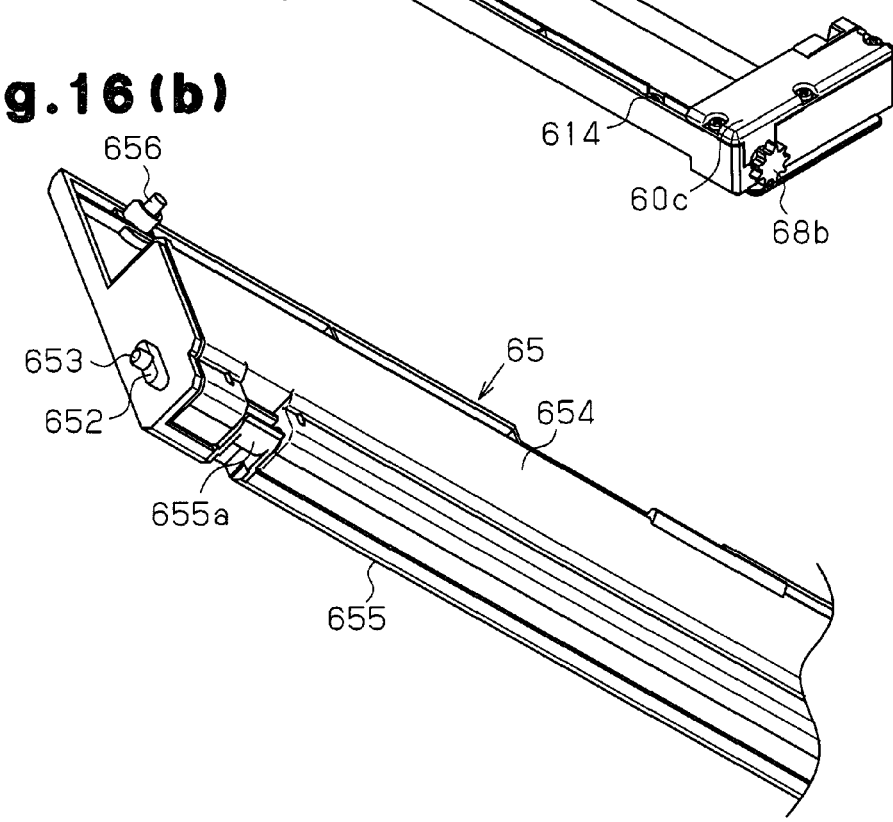
FIG. 16(b) is a partial perspective view of the dust box.

Referring to FIG. 15, the dust box 65 includes two longitudinal ends that are rotatably supported by the housing 61. In a state in which the upstream side of the filter unit 3 faces upward, the dust box 65 is pivotal by a predetermined angle to a position at which the dust inlet 65A faces upward. The pivotal angular range of the dust box 65 is limited. In FIG. 15, angle θ represents an upper limit value (predetermined angle) for the pivot angle of the dust box 65 and is, for example, 110 degrees. The predetermined angle θ is determined so that when the dust box 65 is pivoted by the angle θ, the dust box does not easily return to its original position. However, when the predetermined angle θ is too large, dust easily escapes from the dust inlet 65A. Accordingly, the predetermined angle θ may be in the range of 105 to 120 degrees. Referring to FIGS. 16(a) and 16(b), the dust box 65 can be removed from the filter unit 3 when pivoted by the predetermined angle θ. It is preferable that the dust box 65 be coupled to and removable from the filter unit 3 within a predetermined angular range in which the dust box 65 faces upward. This improves workability. The preferable angular range is the pivotal angle from approximately 80 degrees to the predetermined angle θ.

Figure 17A:
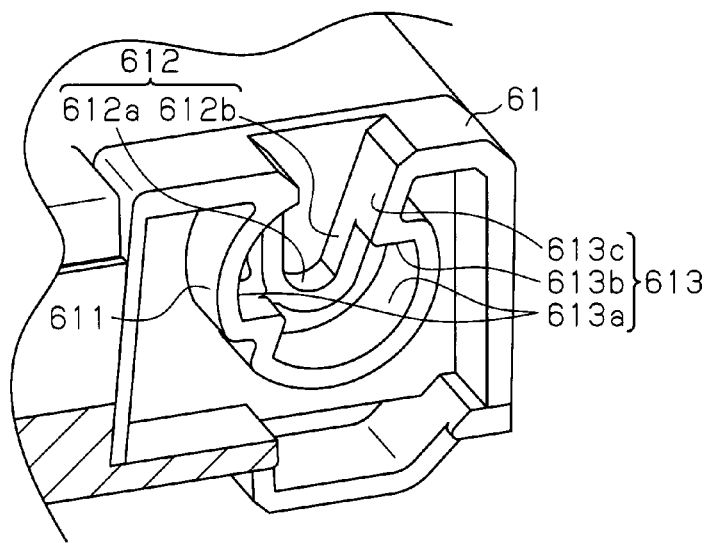
FIGS. 17(a) to 17(c) are perspective views showing a bearing that supports a pivot shaft of the dust box.
Figure 17B:
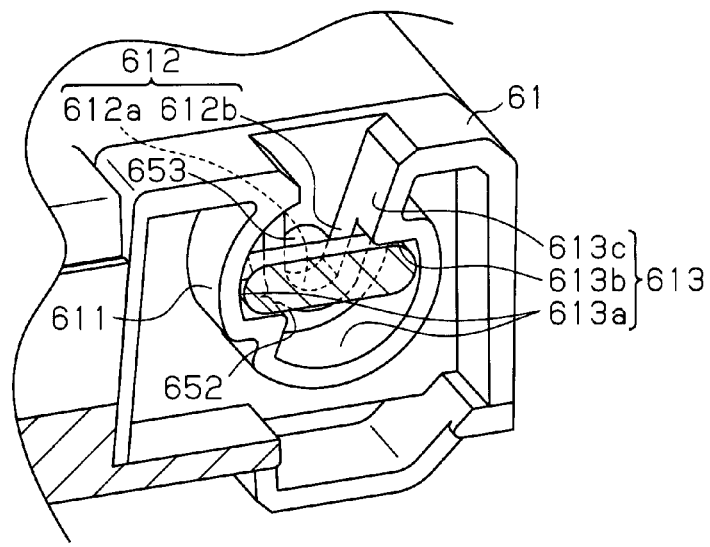
Figure 17C:
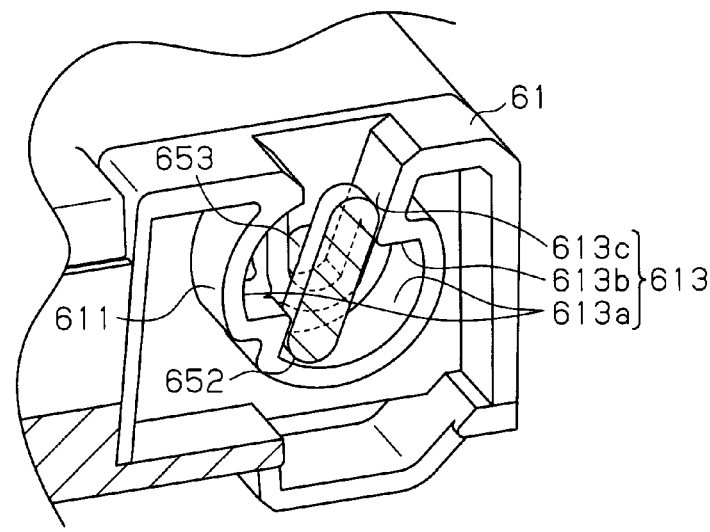

The two longitudinal ends of the dust box 65 each include an elliptic pivot restriction portion 652, which restricts the pivotal angular range of the dust box 65, and a pivot shaft 653, which projects from the pivot restriction portion 652 (refer to FIG. 16). As shown in FIGS. 16 and 17, the housing 61 includes bearings 611, which support the corresponding pivot shafts 653 of the dust box 65.

As shown in FIG. 17, each bearing 611 includes a shaft support 612, which receives the corresponding pivot shaft 653, and a pivot control portion 613, which receives the pivot restriction portion 652. The shaft support 612 includes a semicircular receptacle 612a, which supports the inserted pivot shaft 653, and a guide 612b, which guides the pivot shaft 653 to the semicircular receptacle 612a. The pivot control portion 613 cooperates with the pivot restriction portion 652 to control the pivot angle of the dust box 65 and the coupling and removal position of the dust box 65. In the illustrated example, the pivot control portion 613 includes a cylindrical wall 613a, a restriction wall 613b, and a guide wall 613c. The restriction wall 613b engages with the pivot restriction portion 652 during cleaning and restricts removal of the pivot shaft 653 from the bearing 611. When the dust box 65 is pivoted to the predetermined angle θ, the guide wall 613c interferes with the pivot restriction portion 652 and prevents the dust box 65 from being further pivoted from the predetermined angle θ. The guide wall 613c also guides the pivot restriction portion 652 when coupling and removing the dust box 65 with respect to the housing 61.

As shown in FIG. 14, the dust box 65 includes a bottom piece 654 and a lid 655. The lid 655 is coupled to the bottom piece 654 and pivotal between an open position and a closed position. At least part of the dust box 65, in particular, part of or the entire lid 655, is preferably formed from a transparent material so that the collected state of dust can be visually checked.

As shown in FIG. 14, the bottom piece 654 is narrower than the lid 655. More specifically, the bottom piece 654 includes a distal end located at a position corresponding to the partition wall 651 to define the dust inlet 65A of the dust box 65. The lid 655 includes a distal end located beyond the partition wall 651 at an edge of the housing 61 to cover the rotation brush 64 and the transmission shaft 63. Thus, the lid 655 functions to cover the rotation brush 64 in addition to closing the dust box 65.

Figure 18A:
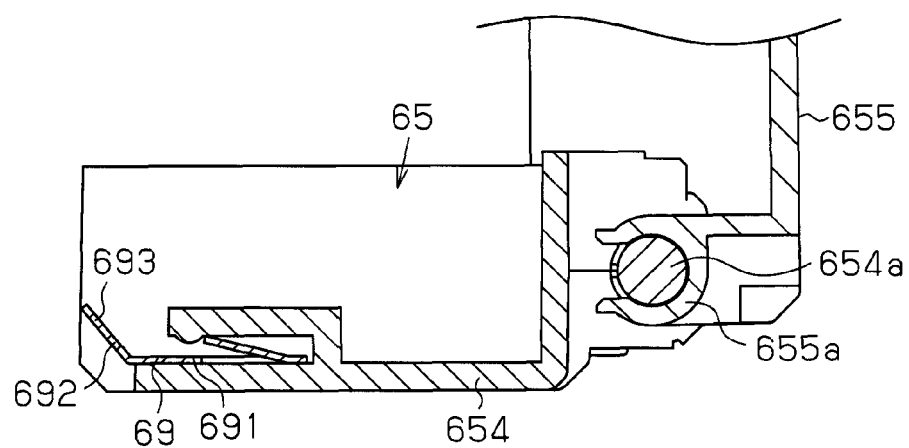
FIGS. 18(a) and 18(b) are cross-sectional views of the self-propelled cleaning unit showing a lid that is open at an angle of approximately 90 degrees and 180 degrees.
Figure 18B:
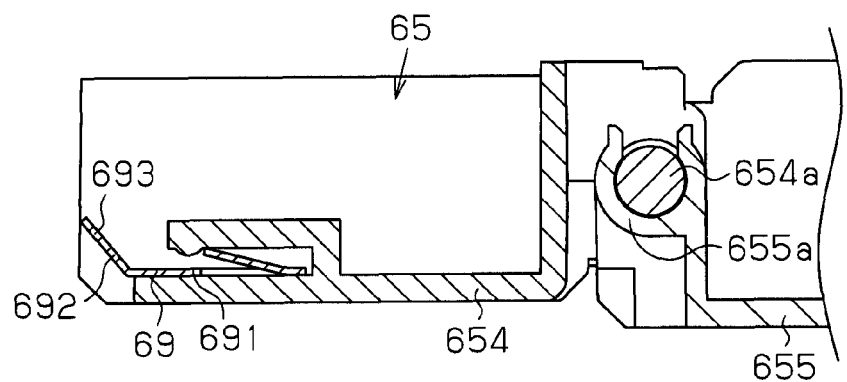

Referring to FIG. 16, the lid 655 is pivotally supported at two locations at the long side that is farther from the rotation brush 64. As shown in FIG. 18, the bottom piece 654 includes a shaft 654a. The lid 655 includes a hinge 655a, which is pivotally and elastically engaged with the shaft 654a. In a state in which the dust box 65 is removed from the housing 61, the lid 655 is pivotal from the closed position by 180 degrees to a fully open position. The pivot restriction portions 652 and the pivot shaft 653 are formed on the lid 655.

As shown in FIG. 14, fastening screws 656 are coupled to a distal portion of the lid 655. The housing 61 includes threaded portions 614. The fastening screws 656 are fastened to the threaded portions 614 of the housing 61 except when the dust box 65 is removed from the housing 61. This prevents pivoting of the dust box 65.

Figure 19:
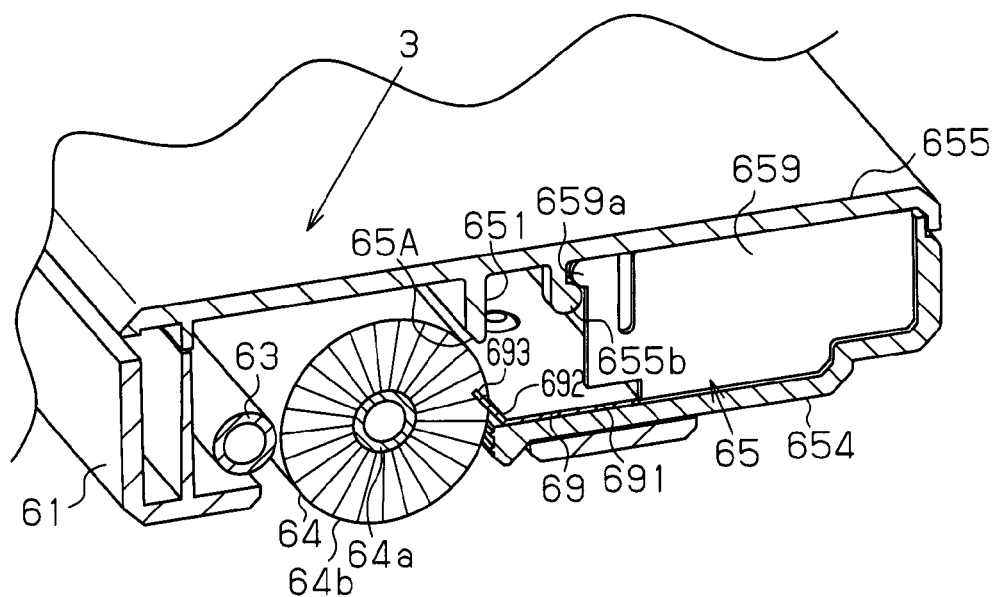
FIG. 19 is a cross-sectional view showing the self-propelled cleaning unit in a closed state at a position corresponding to line F-F in FIG. 10.

As shown in FIG. 10, the dust box 65 includes three partition plates 659, which are formed integrally with the bottom piece 654. The partition plates 659 extend parallel to movement directions M1 and M3 of the rotation brush 64 and are thereby parallel to the optical axis 21AX of each light source lamp 21. As shown in FIG. 19, an engagement projection 655b extends from the inner surface of the lid 655 to fix the lid 655 and the bottom piece 654 at the closed state. A tab 659a is formed on a distal end of one of the partition plates 659 to engage the engagement projection 655b. The engagement projection 655b of the lid 655 elastically engages the tab 659a of the partition plate 659 so that the lid 655 keeps the bottom piece 654 in a closed state.

As shown in FIG. 14, the dust remover 69 of the dust box 65 is a bent member and includes a coupling wall 691, which is parallel to the bottom piece 654, and a sloped wall 692, which is inclined relative to the coupling wall 691. The dust remover 69 may be formed from metal such as stainless. The sloped wall 692 includes a distal portion that defines a comb-shaped portion 693, which cards the rotation brush 64 when a cleaning operation is being performed.

As shown in FIG. 1, the filter unit 3 includes a connector 90, which is connectable to a connector 91 of the outer case 1. The connector 90 may be arranged behind the handle 80 and beside the base 30. A power supply and a signal line connect the connector 90 to the drive unit 62. Connection of the connector 90 of the filter unit 3 to the connector 91 of the outer case 1 supplies the filter unit 3 with power and operates the filter unit 3 based on commands from an operation unit or control unit of the video projector. When the filter unit 3 is slid into and coupled to the outer case 1, the connector 90 of the filter unit 3 becomes connected to the connector 91 of the outer case 1. In the illustrated example, the connected connectors 90 and 91 are hidden by the handle 80.

The operation of the filter unit 3 will now be discussed.

The filter unit 3 is operated when, for example, a clogging sensor (not shown) detects clogging of the first air filter 40. Although not particularly limited, the clogging sensor detects an increase in the current of a fan motor (not shown) that corresponds to an increase in the intake resistance.

When the motor 62a of the filter unit 3 is activated, the transmission shaft 63 and the pinions 68a and 68b are rotated to move the cleaning unit 60 from the standby position shown in FIG. 5 to the return position shown in FIG. 7.

Figure 20:
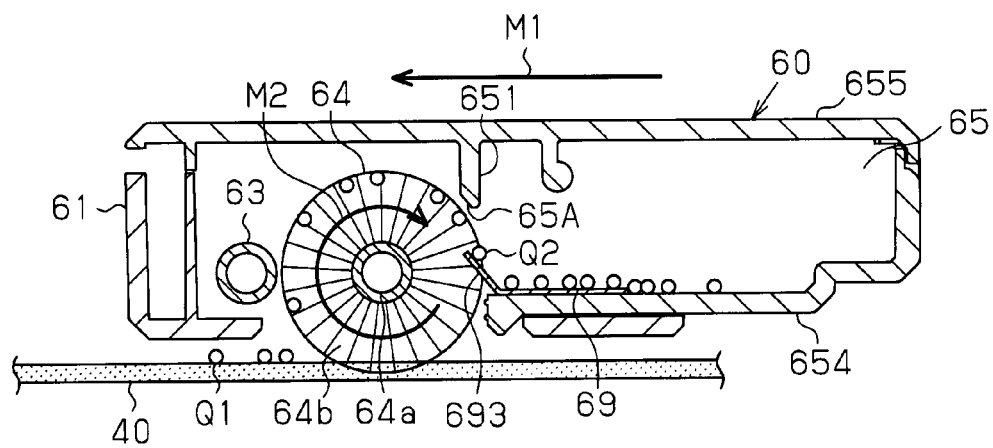
FIG. 20 is a cross-sectional view showing the self-propelled cleaning unit when performing a cleaning operation.

The rotation brush 64 rotates in the direction of arrow M2 (FIG. 20) while pressing the first air filter 40. This removes dust particles Q1 from the first air filter 40. The comb-shaped portion 693 of the dust remover 69 removes dust particles Q2 from the rotation brush 64 at the dust inlet 65A of the dust box 65. The dust particles Q2 are collected in the dust box 65. When the cleaning unit 60 performs cleaning, the dust inlet 65A of the dust box 65 is open in the direction the rotation brush 64 moves.

Figure 21:
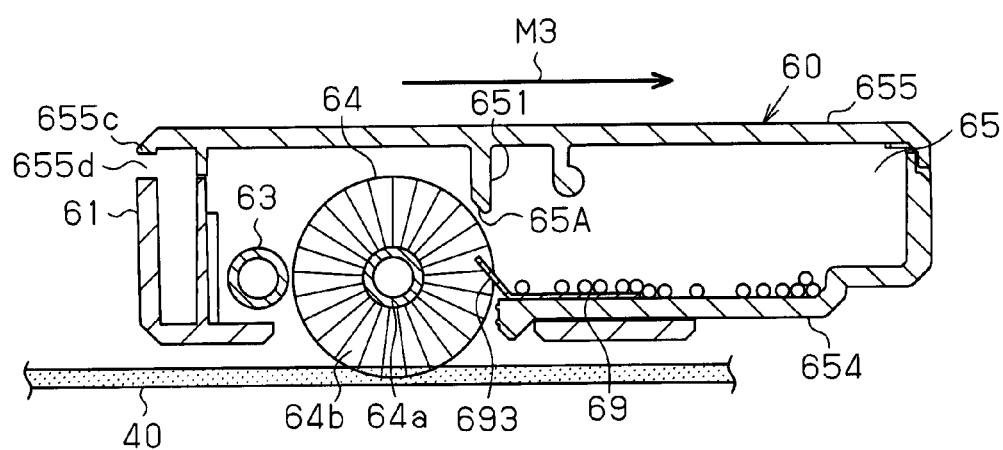
FIG. 21 is a cross-sectional view showing the self-propelled cleaning unit returning to the standby position.

When a position sensor (not shown) detects that the cleaning unit 60 has reached the return position shown in FIG. 7, the motor 62a produces reverse rotation. This moves the cleaning unit 60 to the standby position shown in FIG. 5 (refer to arrow M3 in FIG. 21). When the cleaning unit 60 moves to the standby position, the one-way clutch 66 cuts the transmission of torque from the motor 62a to the rotation brush 64. Thus, the rotation brush 64 does not rotate in the reverse direction. This prevents scattering of the dust particles Q2 removed from the first air filter 40.

Maintenance of the filter unit 3 will now be described.

The operation of the filter unit 3 described above cleans the first air filter 40. Accordingly, the number of times required to clean and replace the first air filter 40 is significantly reduced in comparison to when manually cleaning the first air filter 40. However, the amount of dust on the first air filter 40 increases when the video projector is used over a long period of time. Thus, the first air filter 40 should be removed and cleaned or replaced with a new one after a certain period elapses. In the present embodiment, maintenance is easily performed on the first air filter 40 as described below.

First, the filter unit 3 is drawn out and removed from the front wall 11 of the video projector. This disconnects the connector 90 of the filter unit 3 and the connector 91 of the base 30 without the need for directly touching the connectors 90 and 91. Thus, connectors and plugs do not have to be manually removed from the filter unit 3.

Then, the drawn out filter unit 3 is turned upside down as shown in FIG. 5. In a non-cleaning state, the cleaning unit 60 is located at the standby position. This allows for the screws 40*a* and 40*b* to be unfastened in a direction perpendicular to the filtering surface. Thus, the first air filter 40 may be removed from the base 30 in a direction perpendicular to the filtering surface without interference from the cleaning unit 60 so that the first air filter 40 can be properly washed or cleaned. When necessary, the first air filter 40 may be replaced by a new one. The first air filter 40, which is new, washed, or cleaned, is set at a position corresponding to the opening 31 of the base 30 and fastened to the base 30 by the screws 40*a* and 40*b* without being interfered with by the cleaning unit 60.

To perform maintenance on the second air filter 50 such as washing, cleaning, or replacement, the second air filter 50 may easily be removed from the frame 33 of the base 30 in a direction perpendicular to the filtering surface. For example, the filter unit 3 is removed from the front wall 11 of the video projector. Then, the edges of the second air filter 50 are pulled out of the U-shaped retainers 35 to remove the second air filter 50 from the base 30. When the second air filter 50, which is new, washed, or cleaned, is coupled to the base 30, the upstream side of the urethane sheet 52 is arranged in contact with and supported by the frame 33 of the base 30. Parts of the edges of the laminated body of the electrostatic filtering member 51 and the urethane sheet 52 are forced into the U-shaped retainers 35. This facilitates the coupling of the second air filter 50 to the base 30. In this manner, the second air filter 50 is easily coupled to and removed from the base 30 without being interfered with by the cleaning unit 60.

The disposal of the dust collected in the dust box 65 will now be described. The filter unit 3 is removed from the front wall 11 of the video projector. Then, the filter unit 3 is turned upside down as shown in FIG. 5. The fastening screws 656 fastening the lid 655 are unfastened. As shown in FIG. 15, the dust box 65 is pivoted within a range of approximately 80 degrees to the predetermined angle. This allows for the dust box 65 to be removed from the housing 61 of the filter unit 3. Since the dust box 65 is removed with the dust inlet 65A facing upward, dust does not escape from the dust box 65. Further, the engagement projection 655*b* of the lid 655 is engaged with the tab 659*a* of the partition plate 659. This keeps the bottom piece 654 closed by the lid 655.

Then, the lid 655 is pivoted to open the bottom piece 654 of the dust box 65. The lid 655 may be opened by, for example, 180 degrees at which further pivoting is restricted. Force is applied to the dust box 65 to disengage the engagement projection 655*b* of the lid 655 from the tab 659*a* of the partition plate 659 in the bottom piece 654. The disengagement allows the lid 655 to pivot freely relative to the bottom piece 654.

The pivot restriction portion 652 and the pivot shaft 653 are arranged on the lid 655. This prevents the lid 655 from opening when the dust box 65 is pivoted. If the pivot restriction portion 652 and the pivot shaft 653 were to be arranged, for example, on the bottom piece 654, the user would grasp the lid 655 and pivot the dust box 65 about the pivot shaft 653. When the dust box 65 is pivoted by the predetermined angle θ, the pivot restriction portion 652 would contact the guide wall 613*c*. Thus, the bottom piece 654 cannot be pivoted beyond the predetermined angle θ. However, the lid 655 can be further pivoted. Thus, the bottom piece 654 and the lid 655 may be disengaged from each other, and the lid 655 may open. In contrast, when arranging the pivot restriction portion on the lid 655 like in the present embodiment, the lid 655 cannot be pivoted beyond the predetermined angle. Thus, the bottom piece 654 and the lid 655 would not be disengaged.

In a state in which the dust box 65 is removed from the housing 61, practically all of the rotation brush 64 is exposed as shown in FIG. 16. Thus, the rotation brush 64 may be cleaned with a vacuum cleaner or the like.

After completing maintenance on the dust box 65 and the rotation brush 64, the procedures described above are reversed to assemble the dust box 65 and couple the dust box 65 to the housing 61.

To couple the filter unit 3 to the video projector, the filter unit 3 is slid into the video projector from the front wall 11. Normally, open space is provided in front of the video projector to project light from the projection lens 2A. This easily ensures that sufficient space is provided for the coupling and removal of the filter unit 3. When the filter unit 3 is inserted into the video projector, the connector 90, which is located behind the handle 80, and the connector 91, which is coupled to the outer case 1, are automatically connected. This electrically connects the filter unit 3 to the video projector and controls the filter unit 3 in cooperation with the video projector. Thus, the video projector can restart operation.

The air filter device and video projector of the present embodiment have the advantages described below.

(1) The filter unit 3 automatically cleans the first air filter 40 with the cleaning unit 60.

(2) The dust inlet 65A of the dust box 65 opens toward the rotation brush 64. The dust particles Q2 removed by rotation of the rotation brush 64 are collected in the dust box 65 through the dust inlet 65A. Thus, dust is not scattered.

(3) The dust box 65 is removable from the filter unit 3. This facilitates disposal of the dust collected in the dust box 65 and facilitates cleaning of the dust box 65.

(4) The filter unit 3 includes the base 30, to which the first air filter 40 is coupled. The first air filter 40 is fastened to the base 30, and the cleaning unit 60 moves while rotating the rotation brush 64 to remove the dust particles Q1 from the first air filter 40. Since the cleaning unit 60 moves and the air filter does not move, the space used to accommodate the air filter may be small. This allows for the filter unit 3 to be reduced in size. For example, in the air filter device of Japanese Laid-Open Patent Publication No. 2008-65021 described in the prior art section, the air filer is moved and the brush is not moved. In this case, since space allowing for movement of the air filter is necessary, the air filter device of the prior art is large.

(5) The dust box 65 is permitted to pivot between the angle at which air filter cleaning is performed and the predetermined angle θ, which is 105 degrees to 120 degrees. Accordingly, when the user's hand is separated from the dust box 65 after pivoting the dust box 65 to the predetermined angle, the dust box 65 does not fall toward its original position. Thus, dust does not escape from the dust inlet 65A.

(6) The dust box 65 includes, on each of its longitudinal ends, the pivot restriction portion 652, which restricts pivoting of the dust box 65 at a predetermined position, and the pivot shaft 653, which projects from the pivot restriction portion 652. When the dust box 65 is pivoted to the predetermined angle, the dust box 65 permits removal of the pivot shaft 653. The bearing 611 includes the restriction wall 613*b*, which cooperates with the pivot restriction portion 652 when the dust box 65 is pivoted to the predetermined angle. Such structure of the bearing 611 restricts pivoting of the dust box 65 from the predetermined angle.

(7) The dust box 65 is divided into two, namely, the bottom piece 654, which is coupled to the side that is closer to the first air filter 40, and the lid 655, which closes the bottom piece 654. The lid 655 is supported by the bottom piece 654 so as to open only when the dust box 65 is removed from the filter unit 3. Accordingly, after removal of the dust box 65 from the housing 61, the interior of the dust box 65 may easily be cleaned by opening the lid 655. Further, as long as the dust box 65 is coupled to the housing 61, inadvertent opening of the lid 655 does not occur.

(8) When the dust box 65 is removed from the housing 61, the lid 655 can be opened by 180 degrees from the closed position. When pivoting and opening the lid 655 by 180 degrees, the interior of the dust box 65 may easily be cleaned in a state in which the lid 655 is open.

(9) When an air filter cleaning operation is being performed, the lid 655 closes the dust box 65 and covers the rotation brush 64. Accordingly, the partition 651 can easily be arranged on the lid 655 between the rotation brush 64 and the dust box 65. The partition 651 forms the dust inlet 65A, which prevents dust from escaping the dust box 65. The lid 655 also functions to cover the housing 61. This eliminates the need for a cover dedicated for the housing 61 and reduces the number of components. Further, by opening the lid 655, the interior of the dust box 65 and the rotation brush 64 can be exposed. This facilitates cleaning of the interior of the dust box 65 and the rotation brush 64.

(10) At least part of the dust box 65 (e.g., part of or all of the lid 655) is formed from a transparent material so that the collected state of dust can be visually checked. Accordingly, the amount and state of the dust collected in the dust box 65 may be recognized without opening the lid 655. This is convenient.

(11) The filter unit 3 is arranged in the air inlet 12, through which air is drawn to cool the optical system elements of the video projector. This allows for the video projector to be compact while reducing the burden for cleaning the air filter. In particular, the frequency of maintenance of the first air filter, such as washing, cleaning, and replacement, is significantly reduced. Further, maintenance is facilitated.

It should be apparent to those skilled in the art that the present invention may be embodied in many other specific forms without departing from the spirit or scope of the invention. Particularly, it should be understood that the present invention may be embodied in the following forms.

In the embodiment described above, the cleaning unit 60 may be fixed, and the first air filter 40 may be moved parallel to the filter surface. In this case, it is preferable that the cleaning unit 60 be fixed at the illustrated standby position. This decreases the intake resistance of the first air filter 40.

In the filter unit 3, the dust box 65 may be fixed at the standby position, and only the rotation brush 64 may be moved. When the rotation brush 64 returns to the standby position, dust may be removed from the rotation brush 64, and the removed dust may be collected in the dust box 65. In this case, a motor that moves the rotation brush and a motor that rotates the rotation brush may be prepared, and the rotation brush may be rotated in the same direction regardless of the direction in which the rotation brush moves.

The dust box 65 includes the partition 651, which forms the dust inlet 65A. However, the gap between the rotation brush 64 and the lid 655 may be reduced to eliminate the partition 651. In this case, the rotation brush 64 is rotated in the direction of solid-line arrow M2 or broken-line arrow M4. Thus, dust is mot released from the interior of the dust box 65 and the from the rotation brush 64.

In the first air filter 40, the rim 41 and the grid 42 may be discrete from the porous filtering portion 43, which captures dust that is suspended in air. In this case, after manufacturing each component, the components may be integrated with another by an adhesive agent or the like.

The first air filter 40 is fastened by screws to the frame 33. The first air filter 40 may be coupled to and removed from the base 30 in any of frontward, rearward, leftward, and rightward directions.

The urethane sheet 52 may be eliminated from the second air filter 50. Further, the second air filter 50 may be entirely eliminated.

The U-shaped retainers 35 do not have to support the four sides of the second air filter 50 and may support three or less sides of the second air filter 50. The tabs 35a of the U-shaped retainers 35 are arranged parallel to the pleats of the electrostatic filtering member 51 on the left and right sides of the frame 33 of the base 30 but may be replaced by a single tab extending throughout the entire length of each side of the frame 33.

The filter unit 3 may be automatically operated whenever the video projector completes projection of an image. The filter unit 3 may also be periodically operated at a controlled timing or in response to operation of a cleaning switch.

The optical system of the video projector is not limited to the illustrated example and may be an optical system for a single-LCD projector, for example.

The filter unit 3 is not limited to a video projector and may be applied to various air conditioning systems such as an air conditioner or a dust collector.

The present examples and embodiments are to be considered as illustrative and not restrictive, and the invention is not to be limited to the details given herein, but may be modified within the scope and equivalence of the appended claims.

The invention claimed is:

1. A filter unit comprising:
    an air filter that captures dust from intake air; and
    a cleaning unit that automatically cleans the air filter, wherein the cleaning unit includes
        a rotation brush that removes dust from the air filter and includes a rotation axis, and
        a dust box, a longitudinal direction of which is parallel to the rotation axis of the rotation brush, wherein the dust box includes a dust inlet that extends in the longitudinal direction and opens toward the rotation brush to receive dust from the rotation brush, and the dust box is removable from the filter unit, and
    wherein the dust box includes two longitudinal ends rotatably supported by the filter unit, and
    the dust box is removable from the filter unit only when the dust box is pivoted to an angular position at which the dust inlet faces upward.

2. The filter unit according to claim 1, further comprising a base to which the air filter is fastened, wherein the cleaning unit moves while rotating the rotation brush to collect dust from the air filter.

3. The filter unit according to claim 1, wherein
    the dust box is pivoted to a predetermined angular position separated by a predetermined angle from an air filter cleaning position,
    the pivoting of the dust box beyond the predetermined angular position is restricted, and
    the predetermined angle is 105 degrees to 120 degrees.

4. The filter unit according to claim 3, wherein
    the dust box includes two longitudinal end side surfaces and a pivot restriction portion, which is formed in each of the two longitudinal end side surfaces, and a pivot shaft, which projects from the pivot restriction portion;
    the cleaning unit includes a housing to which the dust box is coupled;
    the housing includes a bearing that supports the pivot shaft;

the bearing permits removal of the pivot shaft when the dust box is located at the predetermined angular position; and the bearing includes a restriction wall that cooperates with the pivot restriction portion when the dust box is located at the predetermined angular position to restrict pivoting of the dust box.

5. The filter unit according to claim 1, wherein the dust box includes a bottom piece, which is located closer to the air filter, and a lid, which closes the bottom piece; and the dust box includes a long side edge located opposite to the rotation brush and the long side edge is pivotally supported by the bottom piece.

6. The filter unit according to claim 5, wherein the cleaning unit includes a housing coupled to the dust box, and when the housing is removed from the dust box, the lid is pivotal from a closed position, at which the lid closes the dust box, to an open position, at which the lid opens the dust box, wherein the open position is separated by approximately 180 degrees from the closed position.

7. The filter unit according to claim 5, wherein the lid covers the rotation brush when the cleaning unit cleans the air filter.

8. The filter unit according to claim 1, wherein the dust box is at least partially formed from a transparent material to allow the dust collected in the dust box to be visually checked.

9. The filter unit according to claim 1, wherein the filter unit is part of a video projector and is arranged in an air inlet in a removable manner.

10. A video projector comprising:

an optical system element;

an air inlet that cools the optical system element; and the filter unit according to claim 1, wherein the filter unit is arranged in the air inlet in a removable manner.

11. A filter unit comprising:

a base including an opening through which air is drawn;

a flat air filter coupled to the base to capture dust from the air passing through the opening; and a self-propelled cleaning unit arranged at an upstream side of the air filter to clean the air filter, wherein the cleaning unit includes a housing movably coupled to the base, a rotation brush coupled to the housing facing toward the upstream side of the air filter and including a rotation axis, and a dust box pivotally supported by the housing and removable from the housing, wherein the dust box includes a dust inlet that extends in the rotation axis of the rotation brush and opens toward the rotation brush to receive dust from the rotation brush, wherein the dust box and the housing include a pivot shaft and a bearing, which supports the pivot shaft, and the pivot shaft can be coupled to and removed from the bearing only when the dust inlet is facing upward.

12. The filter unit according to claim 11, wherein the dust box includes a bottom piece, which is supported by the base, and a lid, which closes the bottom piece, the lid is located at a closed position when the cleaning unit cleans the air filter, and the lid, when located at the closed position, cooperates with the bottom piece to define a dust collection compartment in the dust box and covers the rotation brush.

\* \* \* \* \*